(12) United States Patent
Patil et al.

(10) Patent No.: US 8,351,451 B2
(45) Date of Patent: Jan. 8, 2013

(54) SYSTEM, APPARATUS AND METHOD FOR MANAGING AP SELECTION AND SIGNAL QUALITY

(75) Inventors: Abhishek Patil, San Diego, CA (US); Xiangpeng Jing, San Diego, CA (US); Aixin Liu, San Diego, CA (US); Djung N. Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 673 days.

(21) Appl. No.: 12/535,563

(22) Filed: Aug. 4, 2009

(65) Prior Publication Data

US 2011/0032913 A1    Feb. 10, 2011

(51) Int. Cl.
*H04W 4/00* (2009.01)
*H04B 17/00* (2006.01)

(52) U.S. Cl. .................. 370/429; 370/328; 370/331
(58) Field of Classification Search .................. 370/338, 370/328, 445; 455/442, 443, 445, 446, 449, 455/453

See application file for complete search history.

(56) References Cited

U.S. PATENT DOCUMENTS

| | | | |
|---|---|---|---|
| 7,164,658 B1 | 1/2007 | Shenoy et al. | |
| 7,835,301 B1 * | 11/2010 | Maufer | 370/254 |
| 7,961,674 B2 | 6/2011 | Jing et al. | |
| 8,014,804 B2 * | 9/2011 | Banerjea | 455/513 |
| 8,023,465 B2 * | 9/2011 | Prehofer | 370/331 |
| 2004/0125776 A1 | 7/2004 | Haugli et al. | |
| 2006/0098606 A1 | 5/2006 | Pandey et al. | |
| 2006/0142004 A1 | 6/2006 | He et al. | |
| 2007/0019598 A1 | 1/2007 | Prehofer | |
| 2007/0104215 A1 | 5/2007 | Wang et al. | |

(Continued)

FOREIGN PATENT DOCUMENTS

EP    1696689    8/2006

(Continued)

OTHER PUBLICATIONS

Nicholson, et al. "Improved Access Point Selection", http://www.usenix.org/events/mobisys06/full_papers/p233-nicholson.pdf, 2006.

(Continued)

*Primary Examiner* — Ian N Moore
*Assistant Examiner* — Thai Nguyen
(74) *Attorney, Agent, or Firm* — Blakely, Sokoloff, Taylor & Zafman LLP

(57) ABSTRACT

An embodiment of the invention involves a method for selecting and maintaining wireless communications for wireless mesh networks between tier-2 and tier-3 nodes. The method comprises a first operation of receiving channel information from a first wireless node operating as an access point. The channel information includes each channel number used by one or more wireless nodes that are detected by the first wireless node to be operating within a signal coverage area of the first wireless node. Then, an active scan is conducted on a frequency spectrum for wireless signals based on the channel information. Such scanning is accomplished by initially scanning frequencies of each channel number used by the one or more wireless nodes. After the scanning, a determination is made whether to (i) maintain wireless communications with the first wireless node or (ii) establish new wireless communications with a new wireless node (AP). Other embodiments are described and claimed.

12 Claims, 8 Drawing Sheets

U.S. PATENT DOCUMENTS

| | | | |
|---|---|---|---|
| 2008/0002607 | A1 | 1/2008 | Nagarajan et al. |
| 2008/0192696 | A1 | 8/2008 | Sachs et al. |
| 2008/0205345 | A1 | 8/2008 | Sachs et al. |
| 2008/0267407 | A1 | 10/2008 | Vanderveen |
| 2008/0310342 | A1 | 12/2008 | Kruys et al. |
| 2009/0221287 | A1* | 9/2009 | Balasubramanian et al. ... 455/434 |
| 2010/0188971 | A1* | 7/2010 | Chiang .................. 370/225 |
| 2011/0032842 | A1 | 2/2011 | Patil et al. |
| 2011/0032883 | A1 | 2/2011 | Patil et al. |
| 2011/0032913 | A1 | 2/2011 | Patil et al. |
| 2011/0075586 | A1 | 3/2011 | Hu et al. |

FOREIGN PATENT DOCUMENTS

| | | |
|---|---|---|
| WO | WO 2006-047065 | 5/2006 |
| WO | WO 2006107701 A3 * | 10/2006 |
| WO | WO 2007-092931 | 8/2007 |
| WO | WO 2008/029411 | 3/2008 |
| WO | WO 2008/105771 | 9/2008 |

OTHER PUBLICATIONS

Raju et al., BOOST: A BOOtSTrapping Protocol for 802.11-based Self-Organizing Hierarchial Wireless Ad-Hoc Networks, http://www.winlab.rutgers.edu~sachin/papers/BOOST.pdf, 2003.

International Application No. PCT/US2010/044440, International Search Report, mailed Feb. 25, 2011.

International Application No. PCT/US2010/044169, International Search Report, mailed Feb. 28, 2011.

International Application No. PCT/US2010/044171, International Search Report, mailed Feb. 9, 2011.

S. Sharma et al., "Dynamic Channel Assignment Protocols for Mobile Networks", Journal of Mobile Communication, vol. 1, Issue 2, 2007, See pp. 70-43.

A. Nasipuri et al., "Multichannel CSMA with Signal Power-based Channel Selection for Multihop Wireless Networks", IEEE VTS, Sep. 2000, See the whole document.

I. Wormsbecker et al., "On Channel Selection Strategies for Multi-channel MAC Protocols in Wireless Ad Hoc Networks", IEEE Wireless and Mobile Computing, Networking and Communications, Jun. 19, 2006, See the whole document.

J. Chen et al., "AMNP: Ad Hoc Multichannel Negotiation Protocol for Multihop Mobile Wireless Networks", IEEE International Conference on Communications, Jun. 20, 2004, See the whole document.

U.S. Appl. No. 12/535,595, Non-Final Office Action, mailed Dec. 28, 2011.

U.S. Appl. No. 12/535,595, Notice of Allowance, mailed May 14, 2012.

U.S. Appl. No. 12/535,574, Final Office Action, mailed Mar. 27, 2012.

U.S. Appl. No. 12/535,574, Non-Final Office Action, mailed Jun. 22, 2011.

* cited by examiner

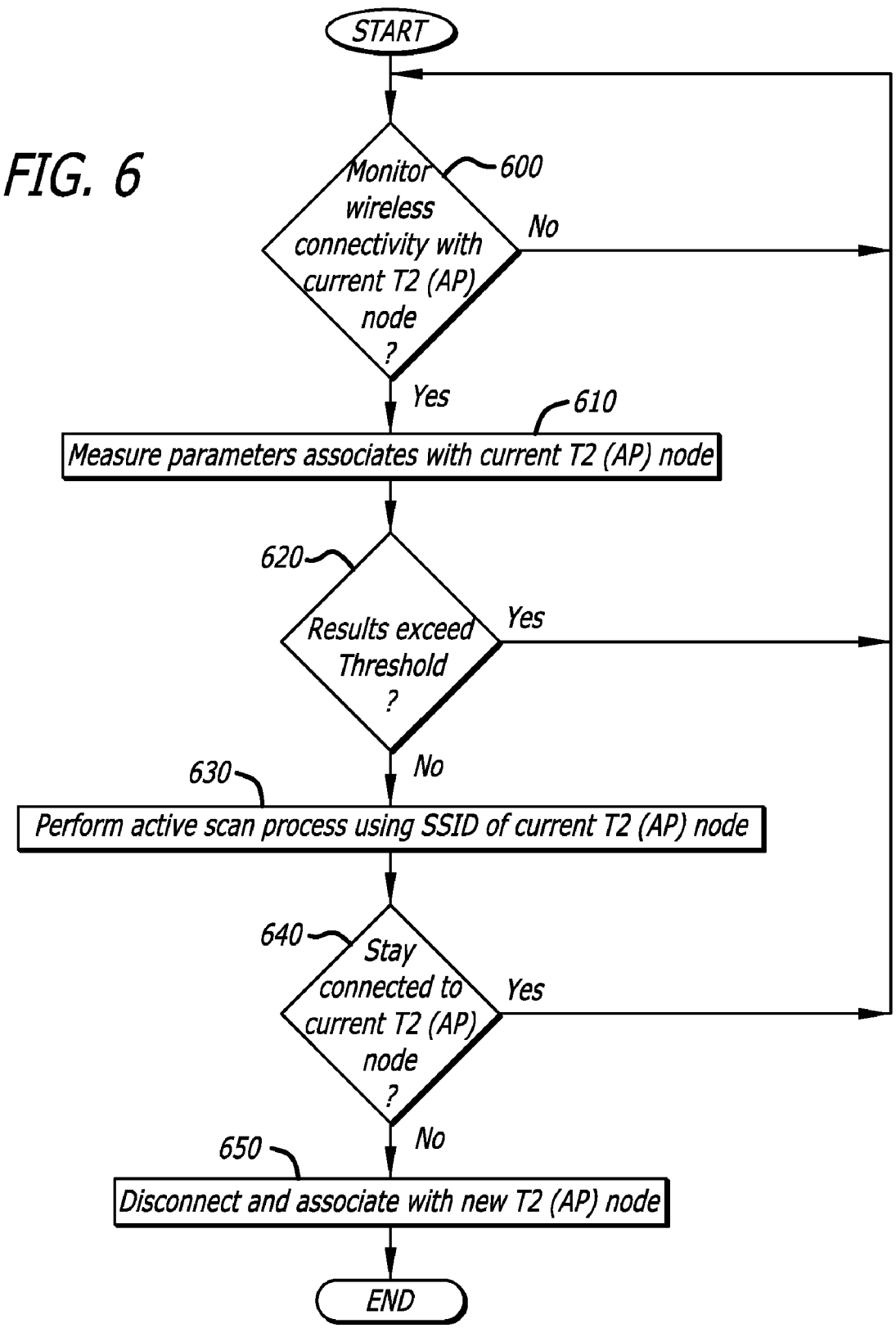

SYSTEM, APPARATUS AND METHOD FOR MANAGING AP SELECTION AND SIGNAL QUALITY

FIELD

The invention relates generally to the field of wireless device connectivity. More particularly, one or more of the embodiments of the invention relate to an apparatus and method for managing access point (AP) selection and varying the periodicity in monitoring communications with the AP based at least in part on the longevity of such communications.

BACKGROUND

A wireless network can provide a flexible data communication system that can either replace or extend a wired network. Using radio frequency (RF) technology, wireless networks transmit and receive data over the air through walls, ceilings and even cement structures without wired cabling. For example, a wireless local area network (WLAN) provides all the features and benefits of traditional LAN technology, such as Ethernet and Token Ring, but without the limitations of being tethered together by a cable. This provides greater freedom and increased flexibility.

Currently, a wireless network operating in accordance with the Institute of Electrical and Electronic Engineers (IEEE) 802.11 Standard (e.g., IEEE Std. 802.11a/b/g/n) may operate in infrastructure mode (infra-mode) or ad hoc mode. As of today, most installed wireless networks are configured and operate in infra-mode where one or more access points (APs) are configured as interfaces for a wired distribution network (e.g., Ethernet). In infra-mode, mobile devices with wireless connectivity (e.g., laptop computer with a radio network interface card "NIC") are able to establish communications and associate with the AP, and thus, the users of these devices are able to access content within servers connected to the wired network.

As an optional feature, however, the IEEE 802.11 Standard specifies ad hoc mode, which allows the radio NIC within each wireless device to operate in an independent basic service set (IBSS) network configuration. Hence, the wireless devices perform peer-to-peer communications with each other instead of utilizing the AP for supporting such wireless communications.

One type of ad hoc network is referred to as a mesh network, which allows for continuous connections and reconfiguration around broken or blocked paths by "hopping" from device to another device until the destination is reached. Mesh networks differ from other networks in that the devices can all connect to each other via multiple hops without infrastructure (e.g., wired APs), and these devices can be mobile or stationary. Related to mesh networks, mobile ad-hoc networks (MA-NETs) are self-configuring networks of mobile routers, where the routers are free to relocate.

One of the primary disadvantages of conventional mesh networks is their inability to effectively manage connectivity with mobile devices by scanning wireless channels for improved AP communications. Effective management may be measured through faster AP selection by the mobile devices along with an improved possibility of finding a neighboring AP with better signal quality. Unfortunately, the conventional AP selection process does not effectively account for periods of intermittent improved signal quality, which results in unnecessary and unwanted roaming to occur. Hence, there is a need for a mechanism to overcome these disadvantages.

BRIEF DESCRIPTION OF THE DRAWINGS

Embodiments of the present invention are illustrated by way of example, and not by way of limitation, in the figures of the accompanying drawings and in which:

FIG. 6 illustrates an exemplary embodiment of the operations of the AP selection logic of the active scan logic of FIG. 5B.

DETAILED DESCRIPTION

Figure 1:
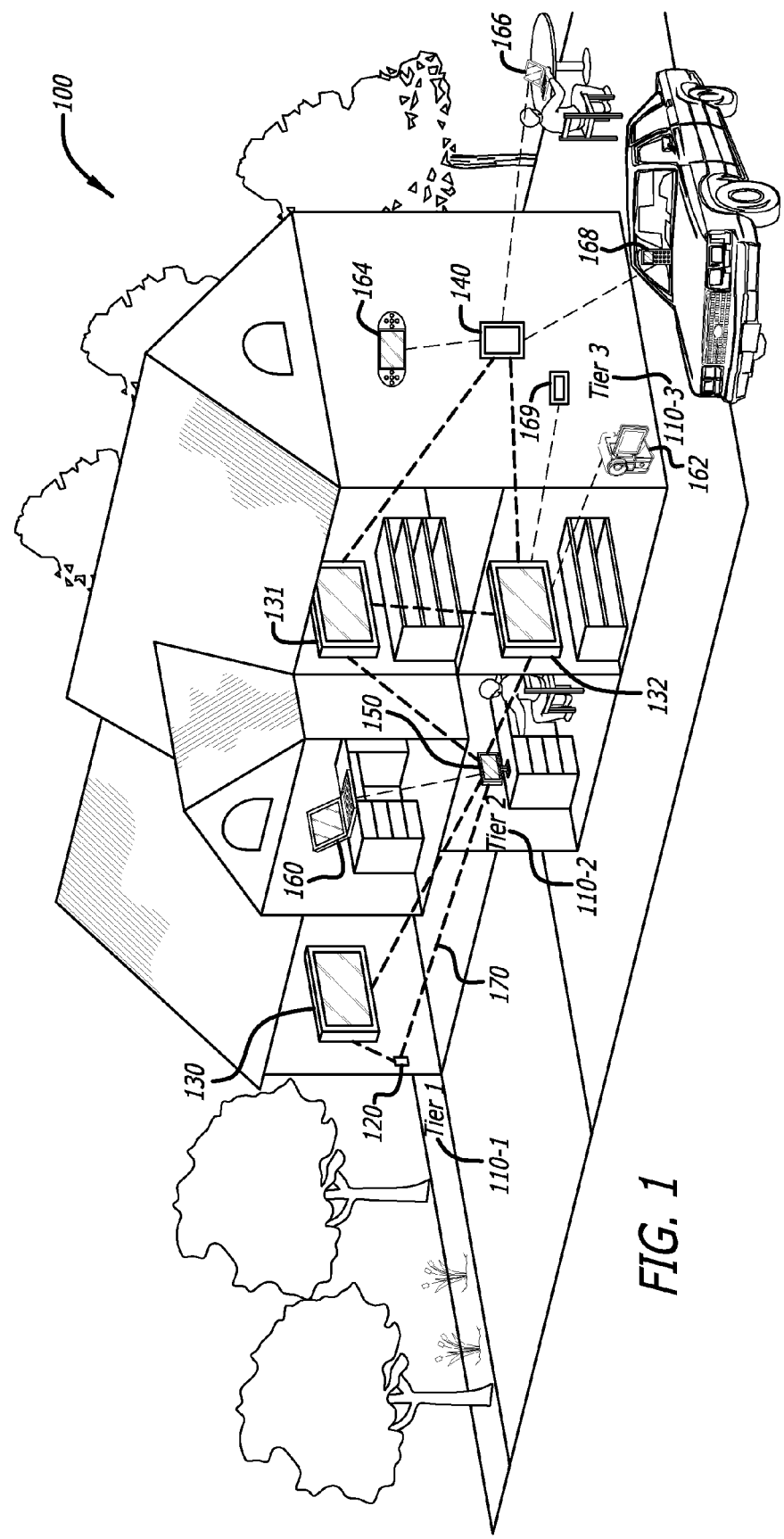
FIG. 1 is a block diagram illustrating an embodiment of a three-tier wireless ad hoc mesh network.

In the following description, for the purposes of explanation, numerous specific details are set forth in order to provide a thorough understanding of the present invention. It will be apparent; however, to one skilled in the art that present invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. For instance, the invention may be applicable for networks generally operating in accordance with any IEEE 802.11 Standard (e.g. IEEE 802.11 a/b/g/n/ . . . ) as well as other standards (e.g., HiperLAN) or any proprietary communication protocols supporting wireless communications, including proprietary communication protocols that are substantially based on well-established standards. In some instances, well-known structures and devices are not shown in block diagram form in order to avoid obscuring the details of the disclosed features of various described embodiments System Architecture In the following description, certain terminology is used to describe certain features of the invention and well-known structures and devices may not be shown or described in detail in order to avoid obscuring the details of the disclosed features of various described embodiments.

The term "node" is generally defined as an electronic device with data processing capability and perhaps wireless communication capabilities. An ad hoc network may be formulated as "OEM-specific," meaning that access is restricted to those wireless nodes that are manufactured and/or endorsed and/or sold by the same entity or a group of entities. For instance, an example of an OEM-specific wireless mesh network (WMN) is a network that comprises a Sony® BRAVIA® digital television in communications with a Sony® Playstation® game console, a Sony® VAIO® computer, a Sony® handheld device, or any of Sony® based products with networking capability.

Herein, there are two general types of nodes. A first type is a "mesh node" that is specifically adapted to join and become a member of an OEM-specific ad hoc network such as an OEM-specific WMN. The second type is a "non-mesh node" that is only able gain access to an OEM-specific WMN indirectly through a mesh node. Such access may be through wireless or wired communications. For this description, the term "node" shall constitute either a "mesh" node or "non-mesh" node and the terms "WMN" or "WM network" shall constitute any type of ad hoc network.

The terms "logic" and "logic unit" are generally defined as hardware and/or software configured to perform one or more functions. One example of a certain type of logic is a radio network interface card (NIC) that features a wireless chipset being one or more integrated circuits operating to transmit and/or receive signals in order to access a wireless network. "Software" is generally described as a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., USB drive, optical disc, digital tape), or the like.

The term "message" represents information configured for transmission over a network. One type of message is a frame that is generally defined as a group of bits of information collectively operating as a single data unit. The term "content" represents video, audio, images, data, or any combination thereof.

Referring to FIG. 1, an exemplary embodiment of a multi-tier wireless mesh network 100 is described. Multi-tier wireless mesh network (hereinafter referred to as "WMN" or "WM network") 100 comprises a collection of nodes that operate as a decentralized, wireless mesh network with multiple (M≧1) sub-networks $110_1$-$110_M$ (hereinafter singularly referred to as "tiers"). Mostly every node of WM network 100 is configured to forward data to other nodes and is assigned to a specific tier based on its performance capabilities and power constraints. The assignment of a node to a particular tier is a decision at least partially based on performance capabilities of the node, whereas routing decisions are made by the nodes based on the network connectivity and the ability to forward data by that particular node.

For instance, one embodiment of WM network 100 features a hierarchical architecture comprising a plurality of tiers (e.g., 3 tiers) that are assigned based on the capabilities of the OEM-specific node. A first tier ("tier-1") $110_1$ is responsible for establishing and controlling access to an external network such as the Internet. For example, first tier $110_1$ may resemble a traditional Internet connection via a cable or direct subscriber line (DSL) connection or 3G/WiMax/Outdoor mesh. As illustrated, first tier $110_1$ comprises a first node 120, which is commonly referred to as a "gateway node." Gateway node 120 may include, but is not limited or restricted to a cable or DSL modem, a wireless router or bridge, and the like. Although not shown, multiple gateway nodes may be present within WM network 100 in order to provide multiple communication paths to external network(s).

A second tier ("tier-2") $110_2$ of WM network 100 may represent a wireless network backhaul that interconnects various stationary (fixed-location) OEM-specific wireless nodes adapted for communicating over a wireless communication medium such as, for example, radio frequency (RF) waves. As described herein, a "tier-2 node" includes, but is not limited or restricted to: a flat-panel television 130, 131, and 132, a gaming console 140, computer 150, or any other electronic device with wireless capability that is usually stationary and electrically coupled to an alternating current (AC) power outlet. Hence, tier-2 nodes usually are not subject to power constraints that are present in tier-3 nodes where power usage is minimized to extend battery life between recharges.

As shown, computer 150 is adapted to operate in two modes. As a wireless mesh node, it can wirelessly communicate with other mesh nodes using the appropriate mesh protocol and be configured by users to join one existing WMN. As a non-mesh node, it can communicate with wireless non-mesh nodes with Ethernet and/or Wi-Fi network cards that are produced by a different manufacturer, to allow them accessing WM network 100 using the standard IEEE 802.11 or Ethernet protocol. Effectively, it enables a non-mesh node access to contents and resources on WM network 100. For instance, flat-panel television 131 may use its Wi-Fi radio operating in accordance with a selected communication protocol (e.g., IEEE 802.11a/b/g/n; HiperLAN, etc.) to associate with computer 150 and effectively access WM network 100. Also, computer 150 allows wired non-mesh nodes to associate with and join WM network 100. Although not shown, a wired non-mesh node (e.g., facsimile machine) can connect to computer 150 by using a standard Ethernet cable. In both cases, such connectivity may be accomplished without any additional hardware or software modification.

In order to maintain a simple architecture and to ease roaming, it is contemplated that tier-2 nodes, when operating as APs, use the same network identification (SSID) and, in some cases, the same security profile (e.g., a saved group of security settings such as Wi-Fi Protected Access "WPA", Temporal Key Integrity Protocol "TKIP", etc.). This greatly assists in AP discovery when a tier-3 node runs an active scan to discover APs that provide better signal quality for that node. The result of the active scan can be quickly processed by ignoring networks that have a different SSID and perhaps different security profiles.

Referring still to FIG. 1, a third tier ("tier-3") $110_3$ of WM network 100 may include links between a node belonging to second tier $110_2$ and one or more tier-3 nodes (160, 162, 164, 166, 168 & 169). A "tier-3 node" may be any battery powered electronics device with wireless connectivity including, but not limited or restricted to a laptop computer, portable handheld device (e.g., personal digital assistant, ultra mobile device, cellular phone, portable media player, wireless camera, remote control, etc.) or any non-stationary consumer electronics devices. Since tier-3 nodes normally have resource constraints (e.g., limited power supplies, limited processing speeds, limited memory, etc.), third tier $110_3$ may provide reduced network services. In one embodiment, tier-3 nodes of WM network 100 may act as a slave or child connecting directly to a tier-2 node, which may further limit their functionality within WM network 100.

Since the traffic on backhaul 170 may include high-definition (HD) video, audio clips and video clips, as well as user data, radio NICs may be incorporated within some of the stationary nodes of the WM network 100. For example, by multiplexing a flow of compressed HD video, multiple Internet video sessions, multiple audio/video sessions and some intermittent http data traffic, the load on backhaul link 170 could reach approximately 60 megabits per second for TCP/UDP type traffic, which may require at least 100 megabits per second of raw radio support considering media access control (MAC) layer efficiency. According to this example, the tier-2 nodes might require an IEEE 802.11n type radio (e.g., at 5 GHz band) to meet such bandwidth requirements.

According to one embodiment of the invention, tier-2 (acting as AP) nodes follow a procedure to decide on non-overlapping channels to use for their infra-mode activity. According to this procedure, every tier-2 (AP) node has information regarding which channel its neighboring tier-2 (AP) node is using. According to one embodiment of this invention, tier-2 nodes are adapted to send this channel information to their tier-3 client nodes in the reserved fields of the beacon (other by other means specific to the implementation) to assist in roaming, thereby ensuring better overall tier-3 network connectivity within the WM network.

Figure 2A:
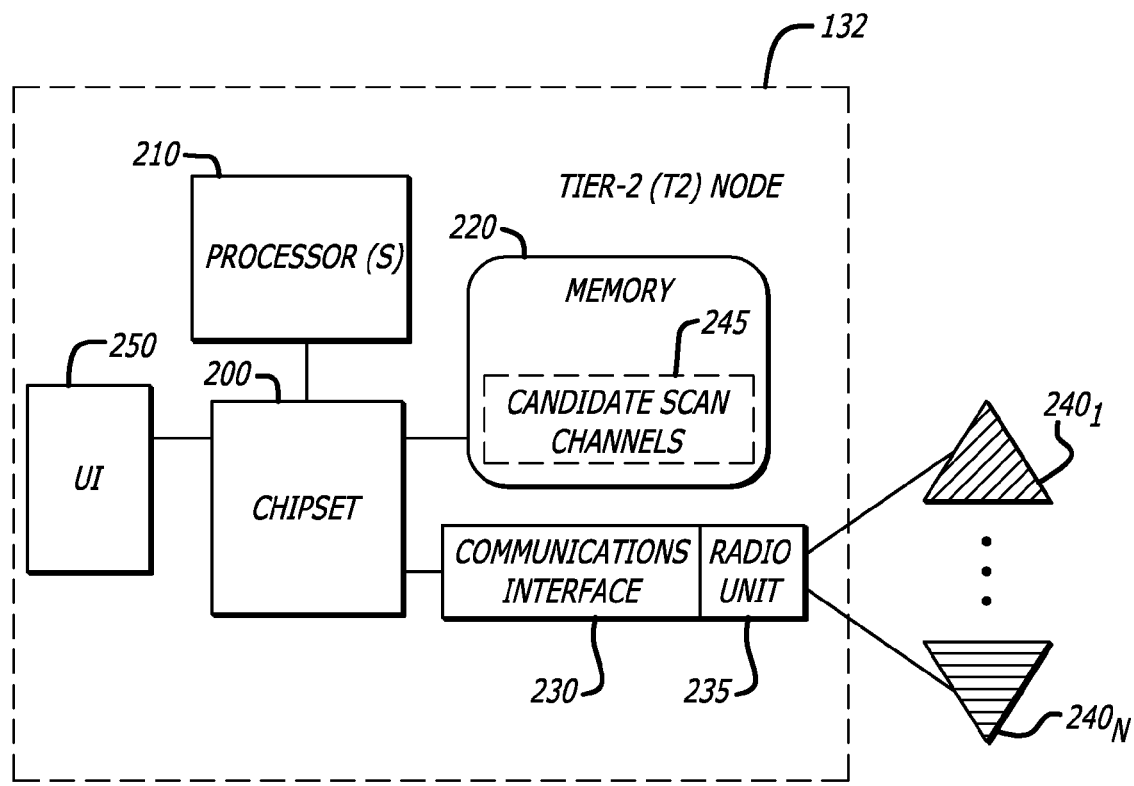
FIG. 2A is a block diagram illustrating a first embodiment of a tier-2 node within the network of FIG. 1.

Referring to FIG. 2A, a first exemplary embodiment of a tier-2 node, such as tier-2 node 132 for example, is shown. Herein, tier-2 node 132 comprises an embedded wireless network chipset 200 in communication with one or more processors 210, memory 220, a communications interface 230 and a user interface (UI) 250. According to this embodiment, tier-2 node 132 may be adapted to operate in two modes (ad hoc & infrastructure) in a Time Division Multiple Access (TDMA) fashion using the same radio logic unit 235 deployed within communication interface 230. Radio logic unit 235 is controlled by processor 210 or dedicated circuitry (not shown) to tune and receive incoming wireless signals on a particular channel via one or more antennas $240_1$-$240_N$ ($N \geq 1$) and to transmit outgoing wireless signals to other nodes over that particular channel. Stored within memory 220, candidate scan channel information 245, being an aggregate of wireless channel information associated with tier-2 nodes operating as access points (APs) in the same signal coverage area as tier-2 node 132 (generally referred to as "neighboring tier-2 node(s)"), is provided to tier-3 node(s) in order to assist in tier-2 (AP) selection. This wireless channel information, which includes at least data representing the wireless channel utilized by a particular neighboring tier-2 node, is sent to tier-3 node as part of a non-unicast message such as within an AP beacon transmitted by tier-2 node 132.

Figure 2B:
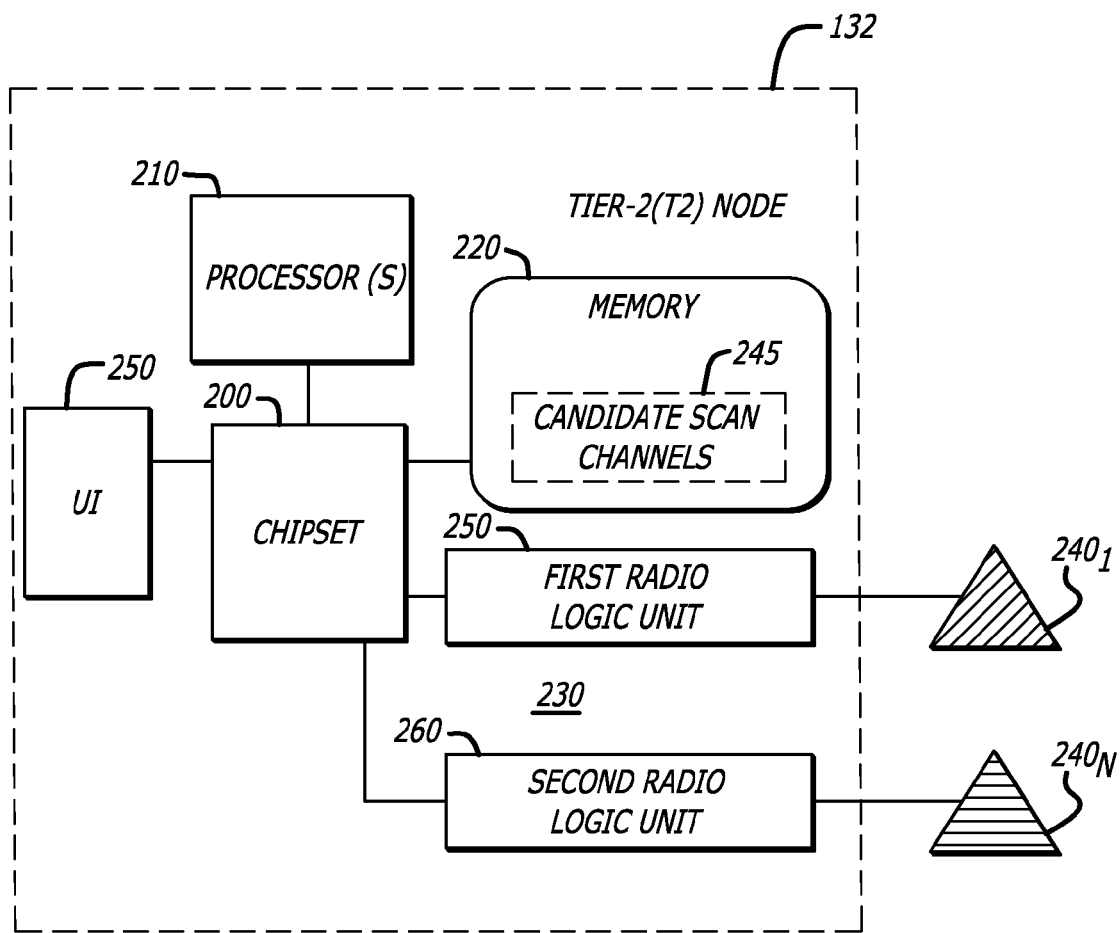
FIG. 2B is a block diagram illustrating a second embodiment of a tier-2 node within the network of FIG. 1.

Referring now to FIG. 2B, a second exemplary embodiment of tier-2 node 132 is adapted to store candidate scan channels 245 is shown. Herein, tier-2 node 132 comprises a first radio logic unit 250 and a second radio logic unit 260. According to one embodiment of the invention, each of the first and second radio logic units 250 and 260 comprises either a single-band or a dual-band Wi-Fi radio which may operate on different channels from each other to avoid interference. First radio logic unit 250 and second radio logic unit 260 receive/transmit messages via antennas $240_1$ and $240_2$, respectively. Herein, first logic unit 250 enables tier-2 node 132 to operate in an ad hoc mode and establish communications with ad hoc networks while second logic unit 260 enables tier-2 node 132 to operate in infra-mode by transmitting beacons and conducting other operations as an AP in its communications with various wireless tier-3 nodes.

Figure 3:
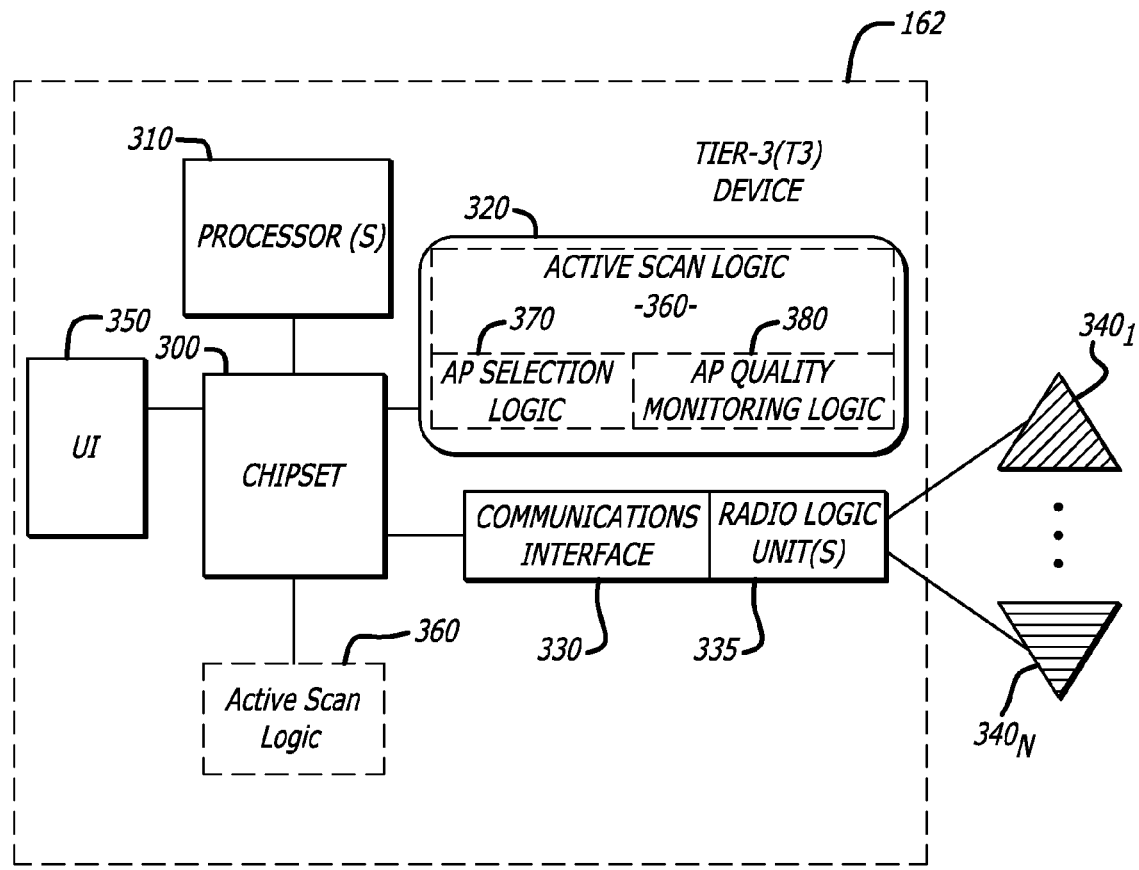
FIG. 3 is a block diagram illustrating an embodiment of a tier-3 node within the network of FIG. 1.

Referring to FIG. 3, an exemplary embodiment of a tier-3 node, such as tier-3 node 162 for example, is shown. Herein, tier-3 node 162 comprises an embedded wireless network chipset 300 that is coupled to one or more processors 310, memory 320, a communications interface 330 and a user interface (UI) 350. According to this embodiment, tier-3 node 162 (due to its limited resources) is adapted to operate in infra-mode only. Radio logic unit 335 is controlled by processor 310 or dedicated circuitry (not shown) to tune and receive incoming wireless signals on a particular channel via one or more antennas $340_1$-$340_R$ ($R \geq 1$) and to transmit outgoing wireless signals to other nodes over that particular channel.

Herein, processor 310 executes active scan logic 360 that is stored in memory 320 while tier-3 node 162 is operating in infra-mode. Of course, it is contemplated that active scan logic 360 may be deployed as firmware or hardware within tier-3 node 162. For instance, as shown by dashed lines in FIG. 3, active scan logic 360 may be implemented as a programmable circuit in communication with chipset 300 in lieu of an executable in memory 320. Active scan logic 360 comprises AP selection logic 370 and AP quality monitoring logic 380.

Referring to FIGS. 1 and 3, typically, tier-3 node 162 will be within the coverage range of more than one tier-2 (AP) node. Therefore, tier-3 node 162 will have more than one AP to select for association and connectivity to WM network 100. Since wireless signal conditions change due to device mobility or environmental changes, tier-3 node 162 periodically monitors its wireless connection with a current tier-2 (AP) node as well as proactively evaluates the availability and signal quality of neighboring tier-2 (AP) nodes. This monitoring process may involve measuring and analyzing certain parameters such as link quality (e.g., signal-to-noise ratio "SNR"), PHY bit rate, transmission/packet error rate, and lost AP beacons. If the result of this analysis indicates poor connectivity, the tier-3 node 162 would initiate an active scan using tier-2 specific AP SSID over different wireless channels in order to evaluate potential connections with the neighboring tier-2 (AP) nodes and select a new tier-2 (AP) node to associate with before the current wireless connection degrades to an unacceptable level.

According to one embodiment of the invention, as described below in further detail, the tier-2 (AP) node (e.g., flat panel television 132), which is currently associated by tier-3 node 162, is configured to provide channel information for its neighboring tier-2 nodes (e.g., gaming console 140). More specifically, this channel information is placed within one or more reserved fields within an AP beacon. AP selection logic 370 of tier-3 node 162 extracts the channel information in order to expedite the re-scan process. In particular, tier-3 node 162 initially scans those wireless channels used by the neighboring tier-2 (AP) nodes such as game console 140, which generally increases the overall speed of the active scan process because the possibility of finding a neighboring tier-2 (AP) node with better signal quality improves if the channels occupied by the neighboring tier-2 nodes are scanned first. The active scan process is adapted to gather information concerning the signal strength received from the neighboring tier-2 (AP) nodes. With this information, tier-3 node 162 can choose whether to stay connected to the current tier-2 node (e.g., node 132) or disconnect and associate with a new tier-2 (AP) node such as gaming control 140.

Referring still to FIGS. 1 and 3, AP quality monitoring logic 380 controls the operations of tier-3 node 162 by altering the frequency in monitoring its wireless connections so that new connections are monitored more frequently than older, established connections. The monitoring time period, namely the cycle time between starting and restarting an active scan process, is shorter in duration for newly established connections than for prior connections perhaps in place for hours or days beforehand. Over time, the monitoring time period is increased until it reaches a predetermined periodic value. Thus, AP quality monitoring logic 380 is adapted to handle errand roaming conditions by prompting the tier-3 node 162 to re-associate with its former tier-2 node or immediately begin to associate with a new tier-2 node if problems with a new connection immediately develop.

Figure 4:
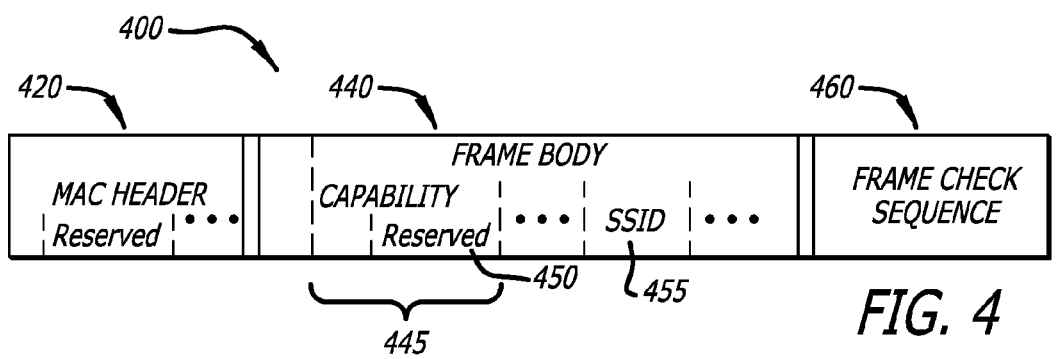
FIG. 4 illustrates an exemplary embodiment of an AP beacon message packet format.

Referring back to FIG. 1, flat panel television 132 is adapted to communicate with other tier-2 nodes (e.g., computer 150, gaming console 140, flat panel television 131) and that is already part of WM network 100. When operating as an AP, during transmission of some or all of its beacons, flat panel television 132 includes wireless channel information associated with its neighboring tier-2 nodes. For instance, as shown in FIG. 4, AP beacon 400 comprises a media access control (MAC) header 420, a frame body 440 and a frame check sequence (FCS) 460. FCS 460 is used for error detection in the transmission of the message.

MAC header 420 comprises a destination address (DA) and a source address (SA). The destination address identifies that AP beacon is a broadcast message. It is contemplated that MAC header 420 may include one or more reserved fields that, according to this embodiment, may be used to contain wireless channel information concerning neighboring tier-2 nodes of the source tier-2 node using AP beacon 400. Alternatively, the wireless channel information may be contained in a reserved element 450, which is a portion of a capability information field 445 of frame body 440. The specific details of how the wireless channel information is exchanged between tier-2 & tier-3 nodes is not discussed herein since it can vary from system to system. SSID element 455 indicates the identity of the WM network featuring the tier-2 node.

Figure 5A:
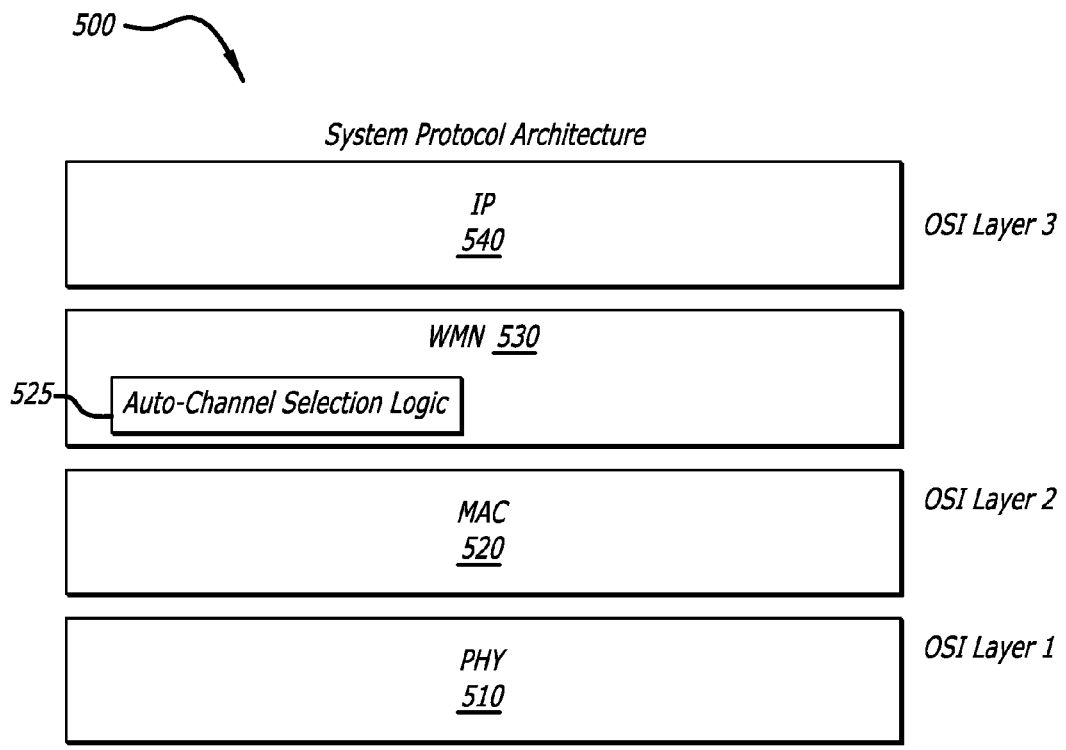
FIG. 5A is a block diagram illustrating an embodiment of a wireless mesh network protocol architecture for a tier-2 node.

As representatively shown in FIG. 5A, in the protocol architecture 500 for a tier-2 node, logic associated with wireless mesh network ("WMN") functionality 530 are placed between MAC layer 520 and network (IP) layer 540 to provide a solution that is independent of the higher OSI layers deployed and can be more easily reconfigured. Hence, WMN layer 530 generally constitutes an "OSI layer 2.5" solution for the tier-2 node. The placement of WMN layer 530 provides enhanced functionality that is transparent to both lower and higher OSI layers.

According to one embodiment of the invention, WMN layer 530 can perform WMN configuration such as auto-channel selection 525 for example, where non-overlapping channels are determined to be available and selected during ad hoc mode based on analysis of a number of parameters. These parameters may include, but are not limited or restricted to the number of non-overlapping channels associated with the particular communication standard supported by the WM network ("$N_c$") along with parameters specific to this particular node and the neighboring nodes: (1) the network degree (e.g., a count of the number of neighboring node for a particular node, "$N_d$"); (2) the MAC address of the node ("$M_{addr}$"); (3) the number of iterations of the channel selection process that the particular node has undergone to select its current channel ("iCount"). Regardless of the channel selection process chosen, each tier-2 node retains and maintains the channel(s) used by its neighboring nodes for channel selection and for subsequent transmission to its tier-3 (client) nodes for roaming determinations.

Figure 5B:
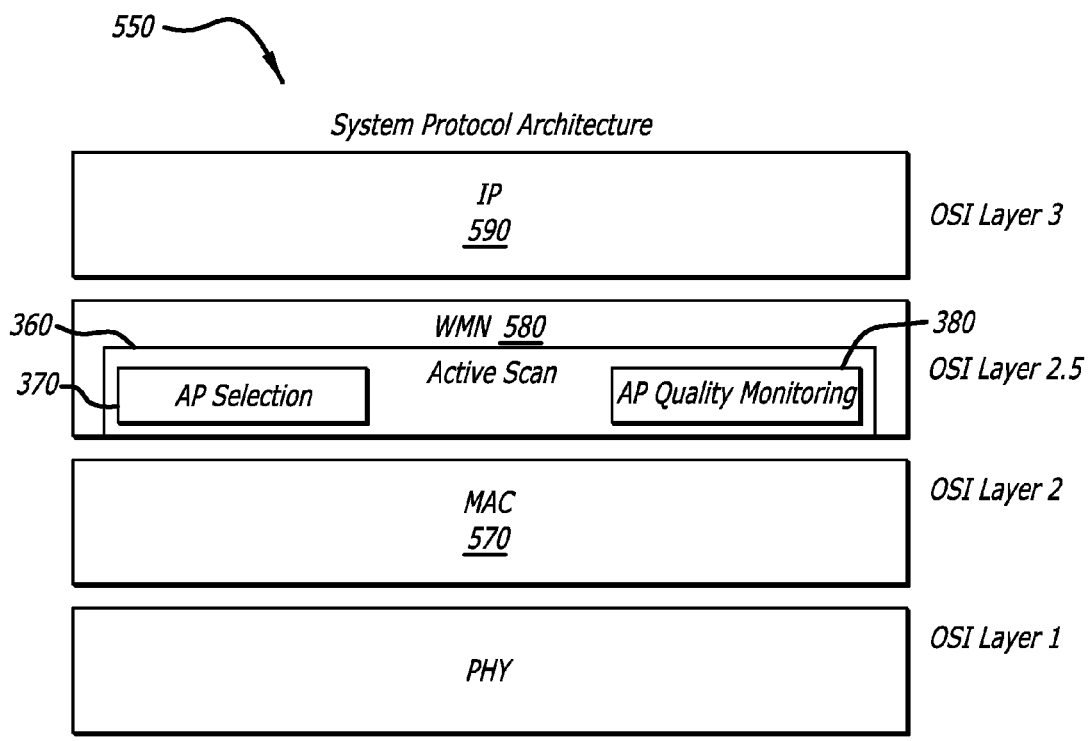
FIG. 5B is a block diagram illustrating an embodiment of a wireless network protocol architecture for a tier-3 node.

As representatively shown in FIG. 5B, in the protocol architecture 550 for a tier-3 node, logic associated with wireless mesh network ("WMN") functionality 580 are placed between MAC layer 570 and network (IP) layer 590 to provide a solution that is independent of the higher OSI layers deployed and can be more easily reconfigured (e.g., an "OSI layer 2.5" layer). The placement of WMN layer 580 provides enhanced functionality that is transparent to both lower and higher OSI layers associated with the tier-3 node.

In one embodiment, WMN layer 580 can perform WMN (infra-mode) functions such as AP selection 370 and/or AP quality monitoring 380 for example. According to this embodiment of the invention, in general, active scan logic 360 is adapted to control the broadcast or multicast of wireless channel information for neighboring tier-2 (AP) nodes that are within its coverage range (AP selection logic 370). This information will assist in the scanning process with a notable improvement in locating a neighboring tier-2 (AP) node with better signal quality than provided by the current tier-2 (AP) node. Also, active scan logic 360 alters the frequency in monitoring connectivity with a tier-2 node by monitoring new connections more frequently than older established connections (AP quality monitoring logic 380).

Referring to FIG. 6, an exemplary embodiment of the operations of the AP selection logic, which is part of the active scan logic implemented within a node (e.g., tier-3 node), is shown. Initially, wireless connectivity with the current tier-2 (AP) node is monitored (item 600). This monitoring involves the measurement and analysis of parameters associated with the current tier-2 (AP) node (item 610). For instance, as an example, the tier-3 node may measure the signal-to-noise ratio (SNR) observed at a tier-3 receiver for signals from the current tier-2 (AP) node. Other parameters may include, but are not limited or restricted to the Physical Layer (PHY) bit rate used by the transmitter, the transmission/packet error rate, or the like.

If the measured parameters exceed a predetermined threshold (e.g., these parameters are lower or higher than the threshold), an active scan process is performed by the tier-3 node using the same SSID of the current tier-2 (AP) node (items 620 & 630). In other words, the tier-3 node begins to scan for other tier-2 nodes having the same SSID (i.e. mesh network name) and perhaps the same security profile. During the active scan process, the client tier-3 node is able to determine and compare the signal strength of other tier-2 node(s) with that of its current associated tier-2 node to make a decision on whether to switch or continue with the current association. Thereafter, based on the scanned results, a decision is made whether the tier-3 node is to remain connected with the current tier-2 (AP) node (item 640). This decision may be made based on the signal strength measured from a neighboring tier-2 node, a greater bit rate used and supported by the neighboring tier-2 node, a lesser transmission/packet error rate, or the like. In the event that a better connection can be established with the neighboring tier-2 (AP) node, the tier-3 node disconnects from the current tier-2 (AP) node and associates with the new tier-2 (AP) node (item 650). Otherwise, the tier-3 node maintains its wireless connection with the current tier-2 (AP) node.

Figure 7:
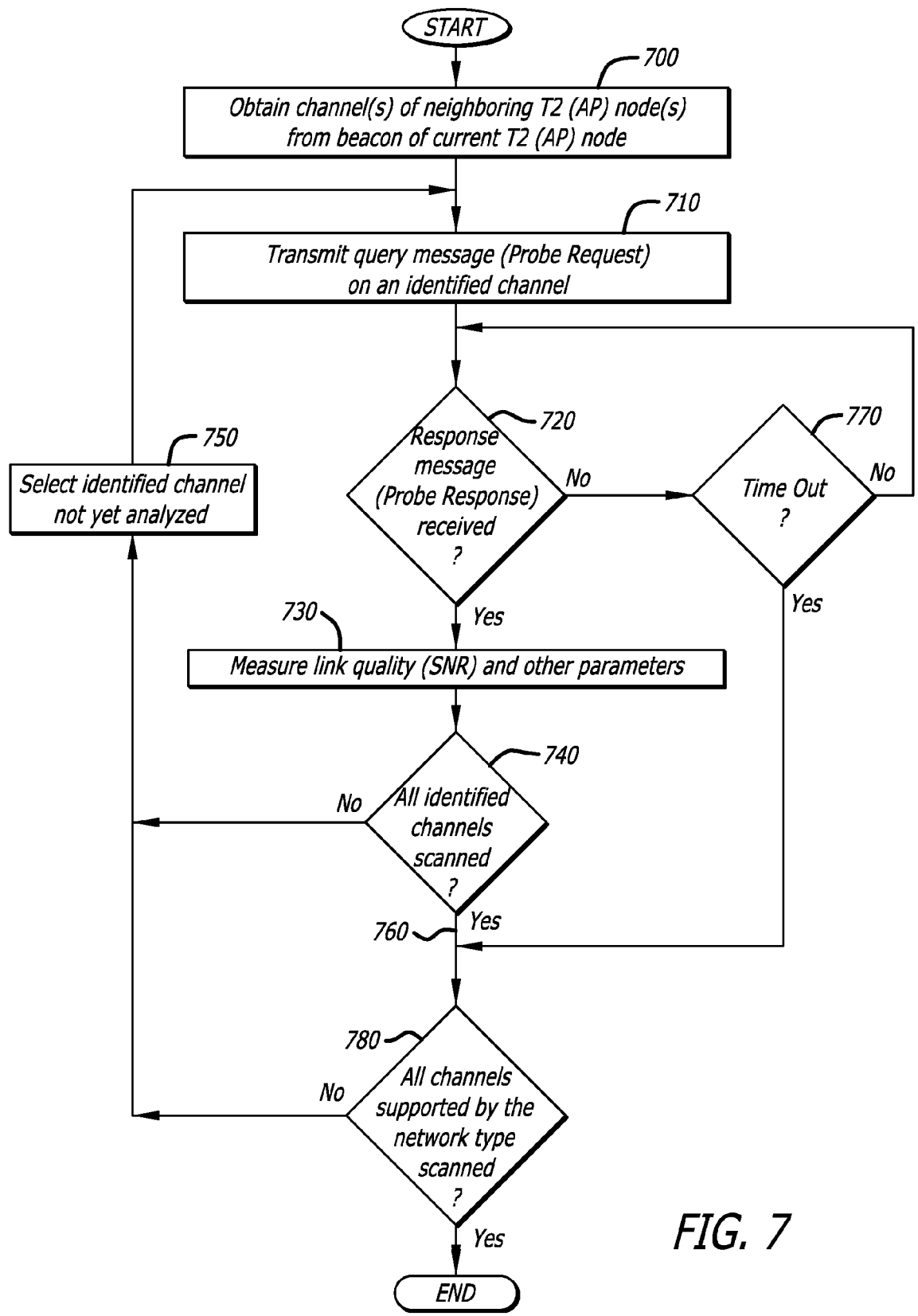
FIG. 7 illustrates a more detailed embodiment of the operations of the AP selection logic of the active scan logic of FIG. 5B.

Referring now FIG. 7, a more detailed embodiment of the operations of the AP selection logic is shown. According with this embodiment, the current tier-2 node transmits a non-unicast message (e.g., an AP beacon), which is received by the tier-3 node. Information pertaining to the wireless channel(s) utilized by the neighboring node(s) for current tier-2 node is extracted from the AP beacon (item 700). In other words, for this embodiment of the invention, the AP beacon is configured to include wireless channel information concerning neighboring tier-2 (AP) node(s). In the alternative, it is contemplated that the wireless channel information may be transmitted separately from the AP beacon, in-band or out-of-band.

For instance, as an illustrative example, the current tier-2 (AP) node may be configured to operate on a first wireless channel (ch1) of a set of three non-overlapping channels (ch1, ch6, ch11) in accordance with a proprietary communication protocol that is based on the IEEE 802.11(b) Standard. However, a first neighboring tier-2 (AP) node is operating on a second channel (ch6). This information about the first neighboring tier-2 operating on the second channel (ch6) is placed within the AP beacon from the current tier-2 (AP) node. Based on this wireless channel information, the tier-3 node may initially scan the second channel (ch6) before proceeding to scan a third channel (ch11). This scan may involve periodically monitoring wireless signals received on the second channel (when the node is idle) or initiating one or more messages and measuring the signal quality from responses to these messages. For instance, the tier-3 node may transmit a query message (e.g., a Probe Request message) over the second wireless channel (ch6) as shown in item 710. If a Probe Response message from the neighboring tier-2 (AP) node is received in a timely manner by the tier-3 node, the link quality (SNR) is measured (items 720 & 730). Thereafter, additional Probe Request messages may be produced for any additional channels identified in the AP beacon until all of the channels associated with the neighboring nodes have been queried (items 740 & 750).

In the event that all of the wireless channels identified in the AP beacon have been scanned (item 760) or if, in response to the Probe Request message, a corresponding Probe Response message is not received in a timely manner (item 770), the tier-3 node continues to conduct an active scan for all of the remaining channels supported by the network type (item 780).

Figure 8:
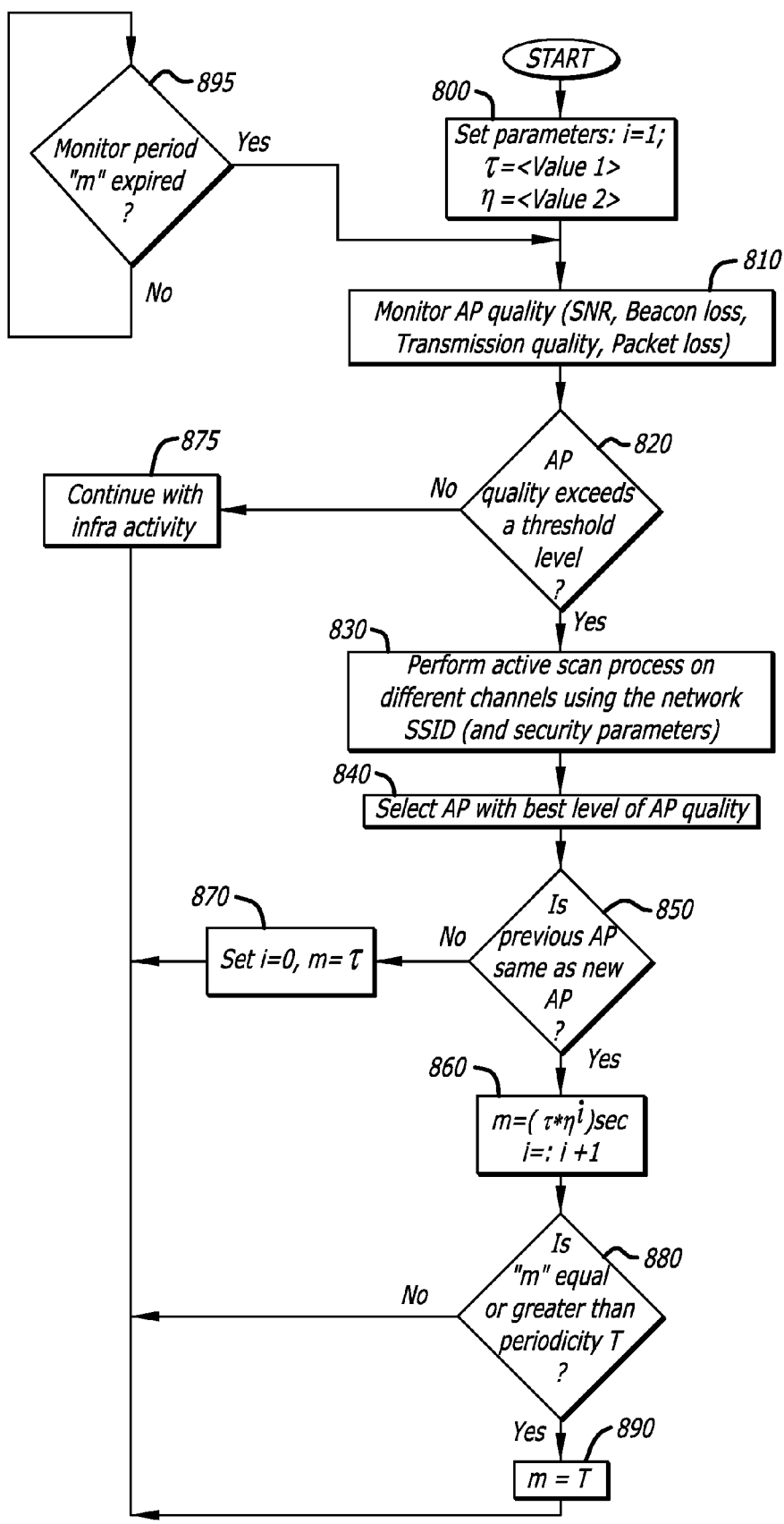
FIG. 8 illustrates an exemplary embodiment of the operations by the AP quality monitoring logic implemented within the tier-3 node of FIG. 5B.

Referring now to FIG. 8, an exemplary embodiment of the operations by the AP quality monitoring logic implemented within the tier-3 node is shown. Herein, parameters that are used to establish the monitoring time period (cycle) are initialized (items 800). For instance, a count value is set to "1". A starting time period ($\square$) is set to a first value and an incremental time period ($\square$) is set to a second value that may differ from the first value. Thereafter, the tier-3 node monitors the wireless connection with the current tier-2 (AP) node (item 810). This monitoring involves the measurement and analysis of parameters such as signal-to-noise ratio (SNR), beacon loss, transmission quality, packet loss and the like.

If the measured parameters exceed a predetermined threshold (e.g., parameter are lower than prescribed threshold minimums or higher than prescribed threshold maximums), the tier-3 node performs an active scan process on different channels using the same SSID of the current tier-2 (AP) node and perhaps its security profile as shown in items 820 and 830. The tier-3 node selects the tier-2 (AP) node with the best level of signal quality (item 840).

If the current tier-2 (AP) node remains the same, as shown in items 850 and 860, the monitoring time period (m) is increased by an incremental value based on the first and second values (e.g., m=$\square$*$\square^i$) and the count value (i) being incremented. If the previous tier-2 (AP) node is not the same as the new tier-2 (AP) node, this denotes a new association and requires the monitoring time period to be initialized again by setting the count value to zero and the monitoring time period to $\square$ (item 870) during continued operations of the new tier-2 node in infra-mode (item 875). Where the computed monitoring time period (m) would be greater than or equal to a predetermined periodicity T, the monitoring time period remains at T (m=T) as shown in items 880 and 890. However, if the computed monitoring time period (m) is less than the predetermined periodicity (T), the monitoring continues with the computed monitoring time period.

Therefore, after each monitoring time period elapses, the tier-3 node monitors AP signal quality and performs active scanning as needed (item 895).

Having disclosed exemplary embodiments and the best mode, modifications and variations may be made to the disclosed embodiments while remaining within the scope of the embodiments of the invention as defined by the following claims.

What is claimed is:

1. A method comprising:
receiving an access point (AP) beacon including channel information from a first wireless node operating as an access point, the channel information is placed within at least one reserved field within a media access control header of the beacon and includes each channel number used by one or more wireless nodes operating as an access point that are detected by the first wireless node to be operating within a signal coverage area of the first wireless node;
conducting an active scan of a range of frequency spectrum for wireless signals based on the channel information by initially scanning frequencies associated with each channel number used by the one or more wireless nodes; and
determining whether to (i) maintain wireless communications with the first wireless node or (ii) establish wireless communications with a selected wireless node of the one or more wireless nodes.

2. The method of claim 1, wherein the first wireless node is a tier-2 node, the tier-2 node being an electronic device with wireless capability that is both stationary and electrically powered by alternating current (AC) power.

3. The method of claim 1, wherein the one or more wireless nodes are also tier-2 nodes.

4. The method of claim 1, wherein the receiving of the channel information comprises receiving the beacon being a non-unicast message from the first wireless node, the non-unicast message including the channel information within the at least one reserved field.

5. The method of claim 1, wherein the conducting of the active scan comprises:
transmitting a query message over a wireless channel used for communications with the first wireless node;
receiving a message in response to the query message; and
measuring a link quality of the message in response to the query message, the link quality being a signal-to-noise ratio measurement for the message.

6. The method of claim 1 further comprising:
disconnecting from the first wireless node and associating with the selected wireless node upon determining to re-establish communications with a wireless network formed in part by the first wireless node and the selected wireless node via the selected wireless node.

7. The method of claim 1 further comprising:
varying a monitoring time period for newly established wireless communications with the selected wireless node by establishing a shorter monitoring time period for the newly established wireless communications with the selected wireless node and increasing the monitoring time period up to a selected static value as the newly established wireless communications with the selected wireless node ages.

8. A portable apparatus comprising:
a radio logic unit adapted for tuning to a selected frequency associated with a particular wireless channel in order to establish communications with a first wireless node operating as an access point; and
a processor in communication with the radio logic unit, the processor to:

extract channel information from a non-unicast message received from the first wireless node, the non-unicast message is an access point (AP) beacon and the channel information is placed within at least one reserved field within a media access control header of the beacon, the channel information includes a channel number used by a second wireless node that is operating as an access point and transmitting signals within a signal coverage area at least partially used by the first wireless node, conduct an active scan of a frequency spectrum for wireless signals based on the channel information by initially scanning frequencies associated with the channel number used by the second wireless node, and determine whether to (i) maintain wireless communications with the first wireless node or (ii) establish wireless communications with the second wireless node.

9. A memory storing software that is executed by a processor implemented within a first wireless node being a portable, battery-powered electronic device with data processing capability and wireless communication capabilities, to perform the operations of:

measuring parameters associated with a wireless signal after a monitoring time period has elapsed, the wireless signal being received over a first wireless channel from a second wireless node that is operating as an access point for a wireless network and is currently in wireless communications with the first wireless node;

performing an active scan process in (i) searching wireless channels different than the first wireless channel using a same network identification of the second wireless node, (ii) detecting wireless signals by a third wireless node over a second wireless channel, and (iii) selecting either second wireless node or the third wireless node for subsequent wireless communications;

increasing the monitoring time period by an incremental value if the second wireless node is selected; and resetting the monitoring time period to a minimum value if the third wireless node is selected.

10. The memory software of claim 9, wherein the software is executed by the processor to perform the active scan process, where the active scan process includes (1) receiving channel information from the second wireless node, the channel information includes each channel number used by the third wireless node that is detected by the second wireless node to be operating within a signal coverage area of the second wireless node, and (2) conducting an active scan of a frequency spectrum for wireless signals based on the channel information by initially scanning frequencies associates with the channel number used by the third wireless node.

11. The software of claim 9, wherein, during the active scan process that is performed by the software executed by the processor, the first wireless node compares a strength of wireless signaling from the second wireless node with a strength of signaling from the third wireless node to make a decision on whether to switch communication from the second wireless node to the third wireless node or continue with a current association with the second wireless node.

12. The software of claim 9, wherein, during active scan process that is performed by the software executed by the processor, the first wireless node compares a strength of wireless signaling from the second wireless node with a strength of signaling from the third wireless node, wherein both the second wireless node and the third wireless node are tier-2 nodes, the tier-2 node being an electronic device with wireless capability that is both stationary and electrically powered by alternating current (AC) power.

* * * * *